US007873017B2

(12) United States Patent
Todd et al.

(10) Patent No.: US 7,873,017 B2
(45) Date of Patent: Jan. 18, 2011

(54) LIMITED-USE DATA RATES IN A WIRELESS LOCAL AREA NETWORK

(75) Inventors: Terence Douglas Todd, Hamilton (CA); Vytas Kezys, Ancaster (CA); Mohammed N. A. Smadi, Hamilton (CA)

(73) Assignees: Research In Motion Limited, Waterloo, Ontario (CA); McMaster University, Hamilton, Ontario (CA)

( * ) Notice: Subject to any disclaimer, the term of this patent is extended or adjusted under 35 U.S.C. 154(b) by 580 days.

(21) Appl. No.: 11/426,342

(22) Filed: Jun. 26, 2006

(65) Prior Publication Data
US 2007/0297357 A1 Dec. 27, 2007

(51) Int. Cl.
*H04W 4/00* (2009.01)
(52) U.S. Cl. ............ 370/338; 370/328; 370/329; 370/331; 450/450; 450/436; 450/442
(58) Field of Classification Search ........... 370/338, 370/328, 329, 331; 455/450, 436, 442
See application file for complete search history.

(56) References Cited

U.S. PATENT DOCUMENTS

| 6,018,662 | A | * | 1/2000 | Periyalwar et al. ......... 455/442 |
| 2004/0023660 | A1 | | 2/2004 | Ben-Eli |
| 2005/0239461 | A1 | * | 10/2005 | Verma et al. ............ 455/435.1 |
| 2008/0214197 | A1 | * | 9/2008 | Englund et al. ............ 455/450 |

FOREIGN PATENT DOCUMENTS

WO 0111833 2/2001

OTHER PUBLICATIONS

Lopez Perez, Mariano, Extended European Search Report for EP 06116088.3, Dec. 27, 2006.
Lopez Perez, Mariano, Second Exam Report for EP 06116088.3, Jul. 23, 2009.
Matar, G, First Office Action for CA 2,607,798, Oct. 7, 2009.

* cited by examiner

*Primary Examiner*—Nghi H Ly
(74) *Attorney, Agent, or Firm*—Integral Intellectual Property Inc.; Miriam Paton

(57) ABSTRACT

A wireless access point advertises data rates that it supports. A mobile station is permitted to communicate with the access point at one or more of the lower data rates only if the mobile station satisfies one or more conditions.

26 Claims, 5 Drawing Sheets

LIMITED-USE DATA RATES IN A WIRELESS LOCAL AREA NETWORK

BACKGROUND

The invention generally relates to wireless local area networks (WLAN) and to cellular networks. In particular, embodiments of the invention relate to roaming of a dual-mode mobile communication device from a WLAN to a cellular network.

In accordance with the Institute of Electrical and Electronics Engineers (IEEE) 802.11 standards, wireless communication between a mobile station (STA) and an access point (AP) is possible at data rates that are predefined in the standards. IEEE standard 802.11b permits communication in 1, 2, 5.5 and 11 Mbps (Mega bits per second). IEEE standard 802.11a permits communication in 6, 9, 12, 18, 24, 36, 48 and 54 Mbps. IEEE standard 802.11g permits communication in any of the data rates defined in IEEE standard 802.11b and IEEE standard 802.11a, and dictates that support for 1, 2, 5.5, 11, 6, 12 and 24 Mbps is mandatory.

The intent behind multiple rates is to permit rate usage which best suits the current STA/AP link quality. Various factors may affect the quality of the link, including, for example, the distance between the STA and the AP, and increases of electromagnetic noise over the medium connecting the STA and the AP. As the quality of the link decreases, mobile stations will drop to lower rates, which require less signal-to-noise ratio (SNR) for reliable packet transmission performance. The link rate selection algorithm is not specified in IEEE 802.11 but is left up to vendor implementations.

In IEEE 802.11 the STA is responsible for triggering handoffs. A negative consequence of this is that a STA may continue to use a link and operate at data rates which are lower than what may be available should the STA handoff to a different AP. That is, in response to decreases in link quality, the station may continue to drop its data rate rather than to scan for an AP which could provide a higher rate link. When this is true the capacity of the network is affected since the station is continuing to use an unnecessarily low data rate.

To prevent capacity loss due to these effects, some APs prevent stations from communicating with them at data rates below certain specified site-dependent values, even though this contradicts the requirements of current IEEE 802.11 standards. STAs are forced to search for a better AP when these limits are reached. For example, in IEEE 802.11, an AP advertises supported data rates in its Beacon broadcasts. These rates are part of its "BSS Basic Rate Set". By specifying a minimum supported rate the AP can enforce a lower limit on the data rates used in its basic service set (BSS). This will help prevent the capacity-lowering behaviour discussed above. The minimum rate specified by the AP would typically be a function of the surrounding Wi-Fi coverage deployment, i.e., in a dense deployment where low quality links are rare, the minimum advertised data rate could be set higher than in a sparse deployment. The above mechanism is geared towards maintaining high capacity in heavy coverage situations.

However, when leaving the area covered by APs of a WLAN, a STA may not be able to find another WLAN to connect to. If the STA is capable also of cellular communication, it may search for a cellular base station and may connect to one if found. A handover from a WLAN to a cellular network may take quite some time, and the mobile station may lose the connection with the WLAN before establishing a connection with the cellular network. If the mobile station is involved in a real-time communication application, for example, a telephone conversation, the application may be interrupted.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Whilst there are a number of different wireless LAN architectures and the present invention is not limited to any particular one, the following description is generally written using the terminology applied in the ANSI/IEEE 802.11 Standards ("Wireless LAN Medium Access Control and Physical Layer Specifications"). It will be obvious to those of ordinary skill in the art how to modify the following for other existing WLAN standards or future related standards. It will also be obvious to those of ordinary skill in the art how to modify the following for other AP-STA protocols which achieve the same effect of data rate advertisement, such as information elements that are sent, for example, according to Cisco CCX (Cisco Compatible Extensions) procedures.

According to current IEEE 802.11 standards, an AP advertises its supported data rates in a Supported Rates Information Element (IE) and possibly also in an optional Extended Supported Rates IE, both of which are included in management frames. A non-exhaustive list of examples for management frames that include a Supported Rates IE includes probe requests, probe responses, authentication requests, authentication responses, association requests, association responses and beacon frames.

In some embodiments of the invention, violations of the AP's minimum advertised supported data rate are permitted under certain conditions. These violations will allow a STA to operate at link data rates that are lower than the minimum advertised supported data rate. The AP may place time constraints on how long a STA can operate the link at rates below the minimum advertised supported data rate. Once a STA starts operating the link at a rate below the minimum advertised supported data rate, the AP may signal to the STA how much time is left before the time constraint is reached.

Figure 1:
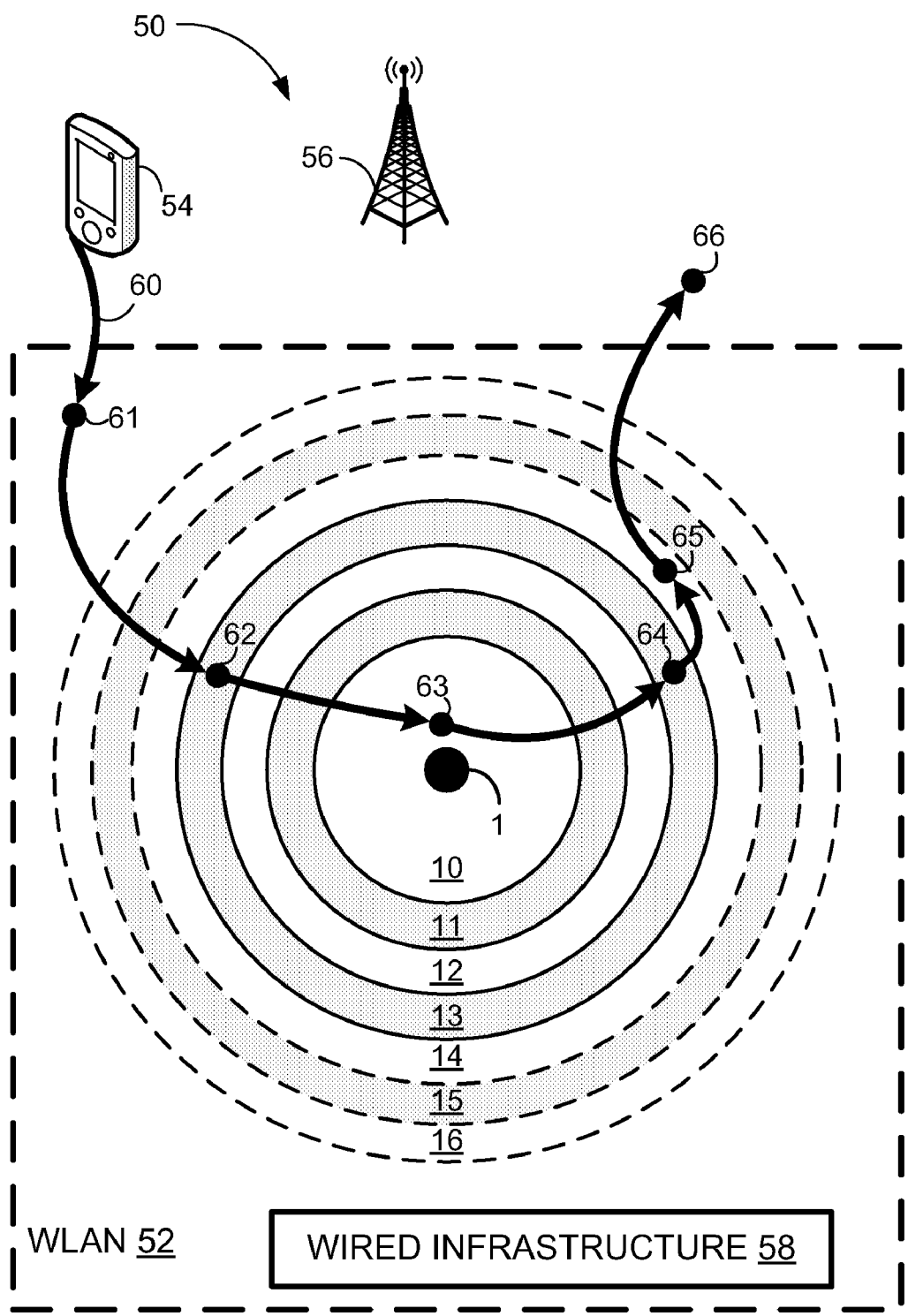
FIG. 1 is an illustration of an exemplary communications system including a wireless local area network, a mobile station and a cellular base station, according to some embodiments of the invention.

FIG. 1 is an illustration of an exemplary communications system 50 including a WLAN 52, a mobile station 54 and a cellular communication base station 56. WLAN 52 includes access points (APs), for example, AP 1. WLAN 52 includes a wired infrastructure 58 to connect WLAN 52 to other networks (not shown).

APs of WLAN 52 may be connected to infrastructure 58 via wired and/or wireless links. WLAN 52, or parts of WLAN 52, may be a "mesh" WLAN, in which one or more APs are connected to infrastructure 58 indirectly through other APs. If WLAN 52 or part of WLAN 52 is a mesh WLAN, WLAN 52 may include one or more mesh points. Wired links, mesh points and APs other than AP 1 are not shown in FIG. 1 so as not to obscure the description of the embodiments of the invention.

Station 54 is able to communicate with cellular communication base station 56 using one or more cellular communication standards. For simplicity of the explanation, cellular communication base station 56 provides a uniform cellular coverage for the area containing WLAN 52.

A non-exhaustive list of examples for standards with which base station 56 and mobile station 54 may comply includes Direct Sequence—Code Division Multiple Access (DS-CDMA) cellular radiotelephone communication, Global System for Mobile Communications (GSM) cellular radiotelephone, North American Digital Cellular (NADC) cellular radiotelephone, Time Division Multiple Access (TDMA), Extended-TDMA (E-TDMA) cellular radiotelephone, wideband CDMA (WCDMA), General Packet Radio Service (GPRS), Enhanced Data for GSM Evolution (EDGE), 3G and 4G communication.

The actual data rate at which an access point communicates with a mobile station is not higher than the supported data rates, and it generally declines as the distance of the mobile station from the access point increases. Moreover, the actual data rate generally declines as the electromagnetic interference at the vicinity of the access point increases. In a simplified manner, decreases in the feasible communication data rate are schematically illustrated in FIG. 1 by concentric circles around AP 1.

In this example, AP 1 is compatible with 802.11g. AP 1 is programmed or hardwired so its supported data rates are 54, 48, 36, 24, 18, 12 and 11 Mbps. The feasible communication data rate of AP 1 within circle 10 is 54 Mbps. The feasible communication data rate of AP 1 within circular bands 11, 12, 13, 14, 15 and 16 is 48, 24, 11, 5.5, 2 and 1 Mbps, respectively.

If certain conditions are met, AP 1 may permit a mobile station to communicate with AP 1 for a limited duration of time at a data rate that is lower than the minimal data rate advertised in a Supported Rates IE, a Extended Supported Rates IE or any other similarly advertised IE. To that end, AP 1 may store in its memory identifications of one or more supported limited-use data rates, the one or more conditions to be met, and the permitted duration of time.

Figure 2:
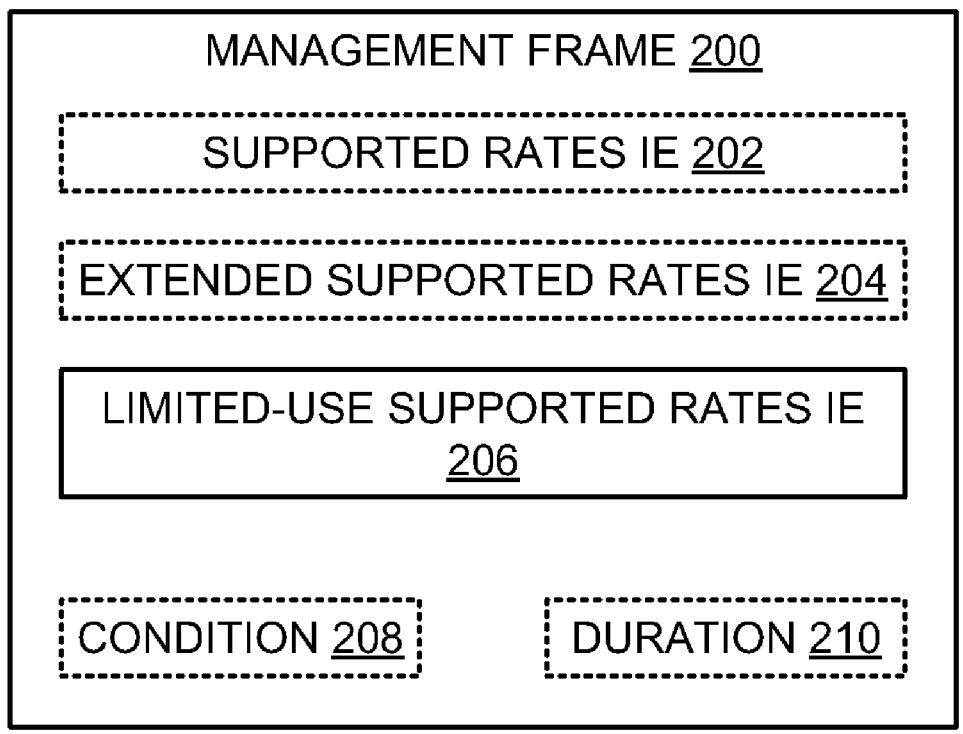
FIG. 2 shows an exemplary WLAN management frame according to some embodiments of the invention.
Figure 3:
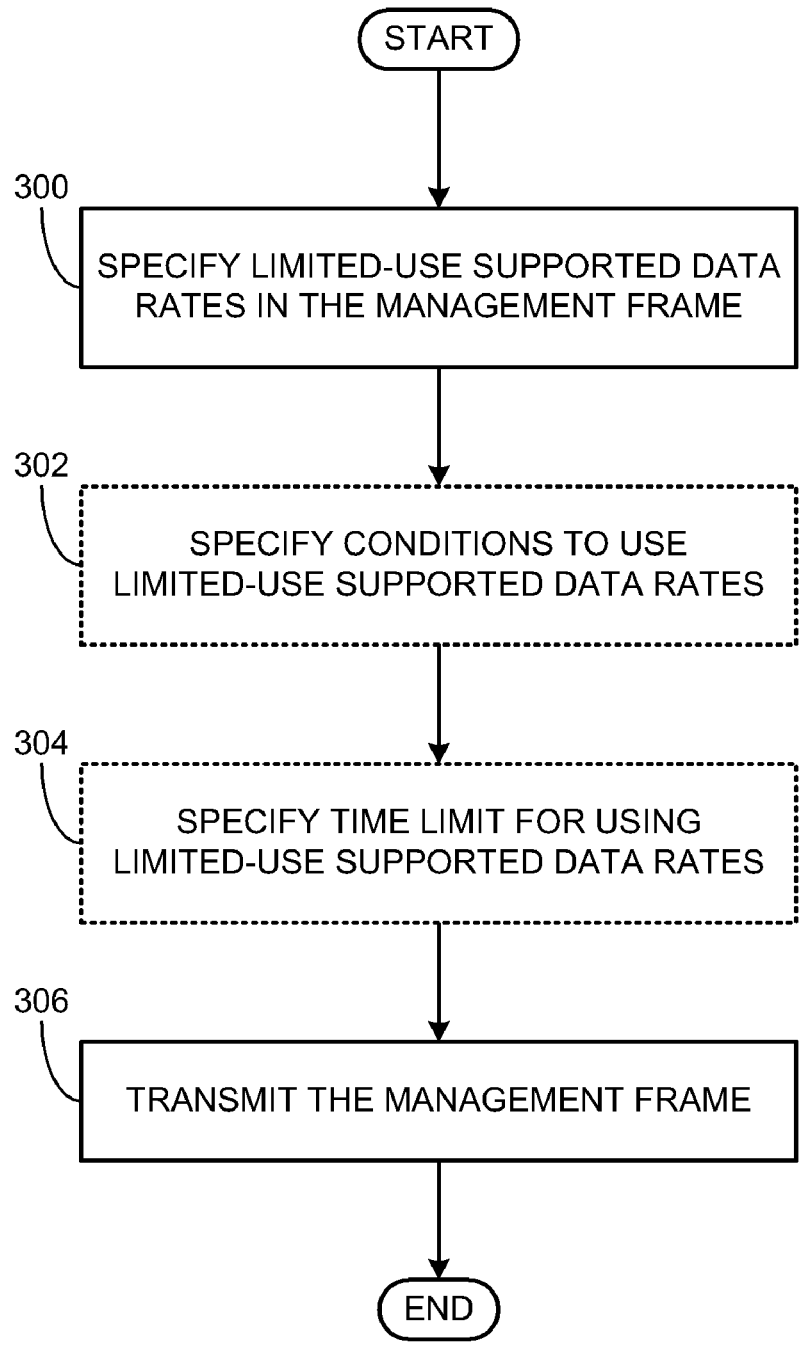
FIG. 3 is a flowchart of an exemplary method for a WLAN access point to prepare and transmit the management frame of FIG. 2, according to some embodiments of the invention.

FIG. 2 shows an exemplary management frame 200 of AP 1, according to embodiments of the invention, and FIG. 3 shows a flowchart of an exemplary method for AP 1 to prepare and transmit management frame 200. Management frame 200 may optionally include a Supported Rates IE 202 in accordance with current or future IEEE 802.11 standards and may optionally include an Extended Supported Rates IE 204 in accordance with current or future IEEE 802.11 standards. Data rates 54, 48, 36, 24, 18, 12 and 11 Mbps may be identified by IE 202 and/or IE 204.

AP 1 may include in management frame 200 an IE 206 that specifies the supported limited-use data rates (300).

AP 1 may optionally specify in a field 208 of frame 200 the one or more conditions that must be met in order for a mobile station to use a limited-use data rate (302). AP 1 may optionally specify in a field 210 of frame 200 the duration of time for which the mobile station is permitted to use a limited-use data rate (304). AP 1 may transmit frame 200 (306).

Returning to FIG. 1, station 54 is carried by a user along a trajectory 60 through locations 61-66. At location 61, station 54 cannot communicate with AP 1. Station 54 initiates a WLAN connectivity sequence in order to connect to an AP, however, it cannot find one. A WLAN connectivity sequence includes probing, authentication and association, and may include other processes, for example, an IEEE 802.11X authentication process.

At location 62, station 54 completes a WLAN connectivity sequence with AP 1 and can communicate with AP 1 at an actual data rate that is not higher than 11 Mbps since location 62 is within circular band 13.

AP 1 may be configured, for example, with a supported limited-use data rate of 5.5 Mbps and a permitted duration of approximately 10 to 20 seconds. AP 1 may also be configured to grant permissions to communicate at supported limited-use data rates only to mobile stations that communicate real time data, for example, VoIP (voice over Internet protocol) and video streaming, and to provide that support only if the mobile stations are about to roam from WLAN 52 to a cellular network. AP 1 and station 54 may use signaling between them to verify whether roaming of station 54 from WLAN 52 to a cellular network is imminent. The time duration may be set to a value which would be sufficient for executing the handoff from the WLAN to the cellular network.

Figure 4:
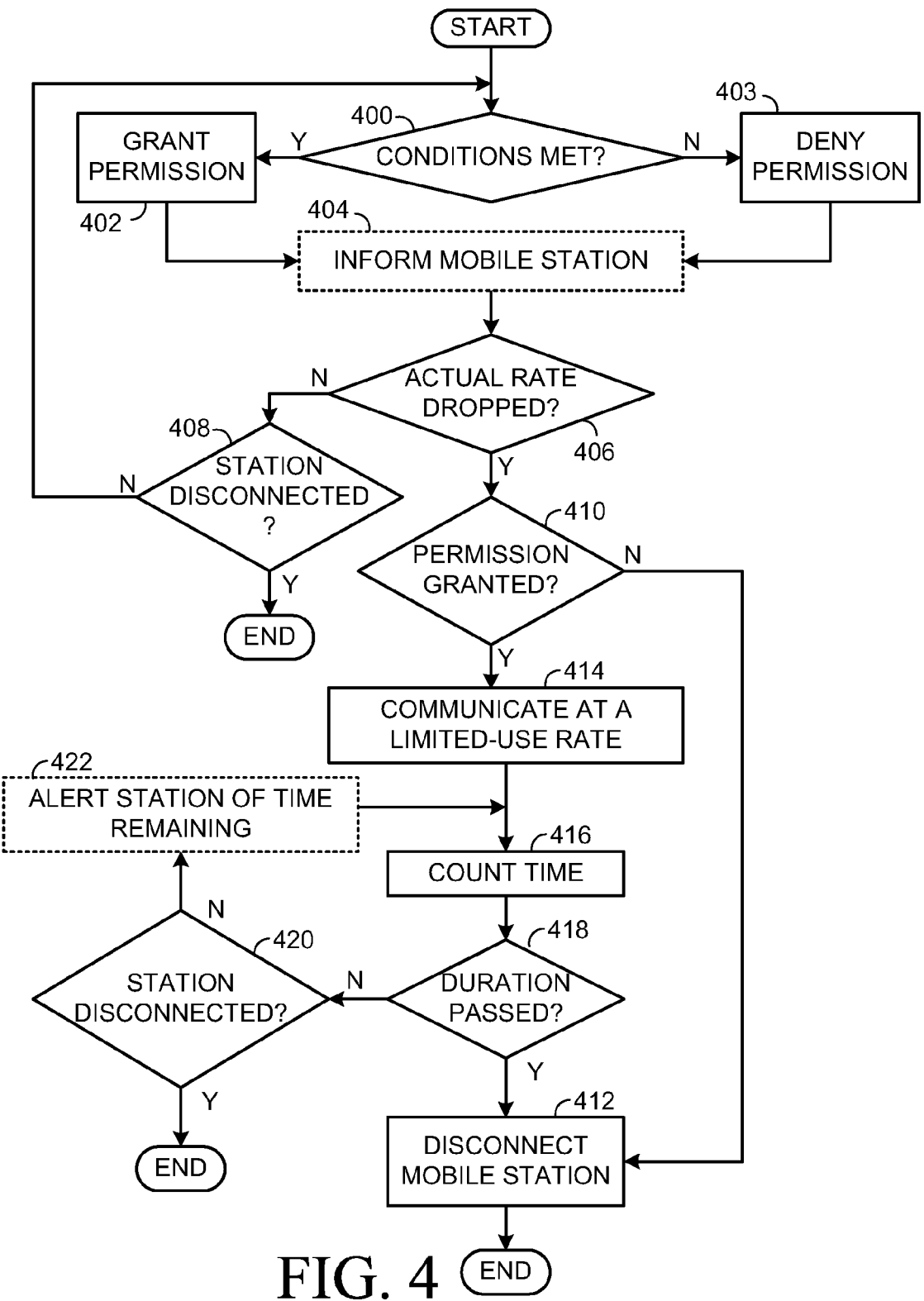
FIG. 4 is a flowchart of an exemplary simplified method for a WLAN access point, according to some embodiments of the invention.

Reference is now made in addition to FIG. 4, which shows a flowchart of an exemplary method for AP 1, according to embodiments of the invention. AP 1 may verify, for example, from signaling between AP 1 and station 54, whether the conditions to use limited-use data rates are met by station 54 (400). For example, AP 1 may recognize that station 54 is involved in a VoIP session through AP 1 and that roaming of station 54 from WLAN 52 to a cellular network is imminent.

If the conditions are met, AP 1 may grant permission to station 54 to communicate with AP 1 at a limited-used data rate (402) and may optionally inform station 54 of this (404). If the conditions are not met, AP 1 may deny station 54 permission to communicate with AP 1 at a limited-used data rate (403) and may optionally inform station 54 of this (404).

As long as the actual data rate is one that is indicated in IEs 202 and 204 or any other similarly advertised IE (406) and station 54 is connected to AP 1 (408), AP 1 may continue to check the conditions at 400, as the status may change. For example, while at location 62, station 54 may be involved in data communication and therefore, according to the example, AP 1 may deny station 54 permission to use limited-use data rates. However, at location 63 station 54 may be involved in a voice conversation and, according to the example, AP 1 may grant permission to station 54 to use limited-use data rates.

If station 54 disconnects from AP 1 (checked at 408), the method ends. While at location 64, station 54 and AP 1 may communicate frames of the voice conversation at a supported data rate that is no higher than 11 Mbps. At location 65, the feasible data rate drops to 5.5 Mbps and station 54 can communicate with AP 1 only at limited-use data rates. AP 1 recognizes that communication with station 54 is possible only at limited-use data rates (checked at 406), and AP 1 checks whether permission to use the limited-use data rates is currently granted or denied to station 54 (410).

If permission is currently denied, AP 1 may disconnect station 54 (412) and the method ends. If permission is currently granted, AP 1 communicates with station 54 at a limited-use data rate (414) and starts counting the duration of the communication at a limited-use data rate (416). Whether the duration of time for which station 54 is permitted to use a limited-use data rate has passed is checked (418), and if station 54 disconnects before the end of the permitted duration (420), the method ends. Otherwise, AP 1 may optionally alert station 54 of the permitted time remaining (422) and the method continues to 416. For example, AP 1 may transmit a frame directed to station 54 that includes an indication of what remains of the duration of time. If the permitted duration of time for communication at a limited-use data rate has expired, AP 1 disconnects station 54 (412) and the method ends.

Figure 5:
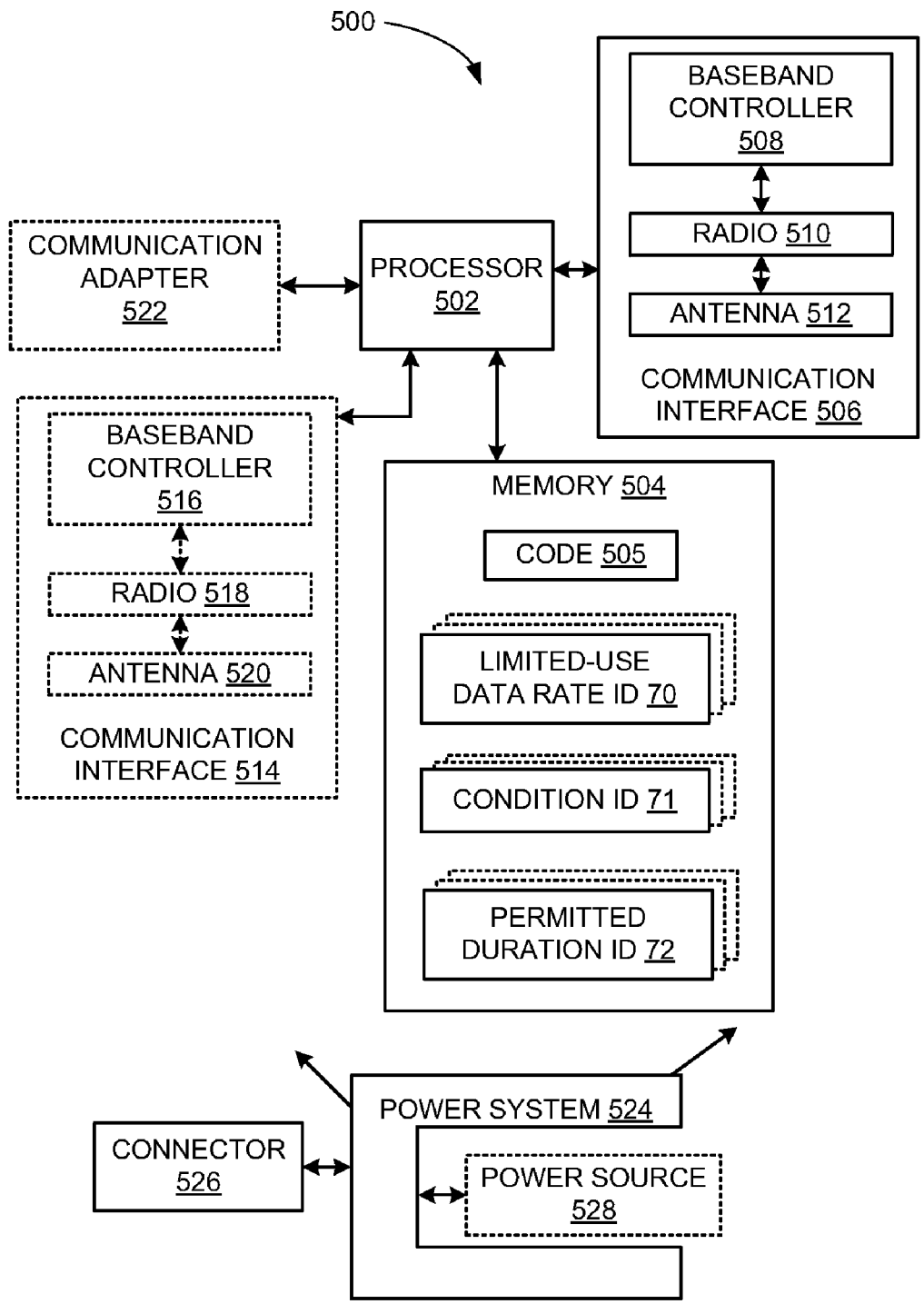
FIG. 5 is a block diagram of an exemplary access point, according to some embodiments of the invention.

FIG. 5 is a block diagram of an exemplary access point 500, according to some embodiments of the invention. AP 500 includes a processor 502 and a memory 504 coupled to processor 502. Memory 504 includes identifications 70, 71 and 72 of the one or more supported limited-use data rates, the one or more conditions and the permitted duration of time, respectively. Memory 504 also includes code 505 that, when executed by processor 502, may implement the methods described herein.

AP 500 includes a wireless communication interface 506, compatible with one or more standards of the family of IEEE 802.11 wireless communication standards. Wireless communication interface 506 is coupled to processor 502 and includes at least a baseband controller 508, a radio 510, and an antenna 512.

AP 500 may optionally include an additional wireless communication interface 514, compatible with one or more standards of the family of IEEE 802.11 wireless communication standards. Wireless communication interface 514 is coupled to processor 502 and includes at least a baseband controller 516, a radio 518, and an antenna 520. AP 500 may optionally include a wired communication adapter 522, for example, an Ethernet adapter.

By way of wireless communication interface 506 and/or wireless communication interface 514, AP 500 may be able to establish communication sessions with other devices, such as mobile stations and/or other access points.

AP 500 includes a power system 524 and a connector 526 coupled to power system 524. AP 500 may optionally include a power source 528 coupled to power system 524. Connector 526 is connectable to an external power source (not shown) to provide power for charging power source 528 and/or for operating AP 500. Power system 524 provides electrical coupling between the external power source and power source 528, and provides electrical coupling between power source 528 and the electrical components of AP 500 (e.g. processor 502, memory 504, and the like). As part of the electrical coupling between the external power source and power source 528, power system 524 may control the charging of power source 528 with electrical charge drawn from the external power source.

A non-exhaustive list of examples for processor 502 includes any combination of microprocessors, microcontrollers, central processing units (CPU), digital signal processors (DSP), reduced instruction set computers (RISC), complex instruction set computers (CISC) and the like. Furthermore, processors 502 may comprise more than one processing unit, may be part of an application specific integrated circuit (ASIC) or may be a part of an application specific standard product (ASSP).

A non-exhaustive list of examples for memory 504 includes any combination of a) local memory, bulk storage, cache memory b) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like; c) optical devices, such as compact disk read only memory (CD ROM), and the like; and d) magnetic devices, such as a hard disk, a floppy disk, a magnetic tape, and the like.

A non-exhaustive list of examples for power source 528 includes one or more Ni—Cd (Nickel Cadmium) batteries, one or more Ni-MH (Nickel-Metal Hydride) batteries, one or more Lithium Ion batteries, one or more rechargeable Alkaline batteries, one or more capacitors, one or more supercapacitors, and any other suitable power source. A non-exhaustive list of examples for an external power source includes an AC power source, a DC power source, wind-power-conversion power source, solar-power-conversion power source.

A non-exhaustive list of examples for antennae 512 and 520 includes dipole antennae, monopole antennae, multilayer ceramic antennae, planar inverted-F antennae, loop antennae, shot antennae, dual antennae, omnidirectional antenna and any other suitable antennae.

A non-exhaustive list of examples for mobile station 54 includes a wireless-enabled laptop, a wireless-enabled cellphone, a wireless-enabled personal digital assistant (PDA), a wireless-enabled video camera, a wireless-enabled gaming console, a wireless Internet Protocol (IP) phone and any other suitable mobile station.

Although the example described above relates to a handoff of a mobile station from an IEEE 802.11 wireless network to a cellular network, embodiments of the invention are applicable to other situations in which a mobile station needs to communicate with an access point at a lower data rate than those advertised in the Supported Rates IE, Extended Supported Rates IE or any other similarly advertised IE. For example, the handoff may be to a non-cellular network. In another example, the handoff may be within an IEEE 802.11 WLAN but from an access point that is part of one Extended Service Set (ESS) to another access point that is part of a different ESS. The different ESS may be in a different IP subnetwork. Such a handoff may last up to several seconds, and it may be beneficial to extend the connection of the mobile station to the current access point.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a wireless access point that is supporting a wireless local area network, the method comprising:

from a list of data rates that are supported by said wireless access point, specifying a minimum data rate for advertisement in said wireless local area network;

advertising an indication of said minimum data rate;
reserving for limited use those of said supported data rates that are less than said minimum data rate for advertisement;
storing indications of one or more conditions for use of said one or more supported data rates reserved for limited use;
denying permission to a mobile station to communicate with said wireless access point at any of said one or more supported data rates reserved for limited use where none of said one or more conditions is satisfied by said mobile station; and
permitting said mobile station to conduct communications with said wireless access point at one or more of said one or more supported data rates reserved for limited use where said mobile station satisfies at least one of said one or more conditions.

2. The method of claim 1, wherein said one or more conditions includes that said mobile station has an active real time connection in progress.

3. The method of claim 1, wherein said one or more conditions includes that said mobile station has an active voice connection in progress.

4. The method of claim 1, wherein said one or more conditions includes that said mobile station is about to perform a handoff to another network.

5. The method of claim 4, wherein said other network is a cellular network.

6. The method of claim 4, further comprising:
recognizing from signaling with said mobile station that said mobile station is about to perform said handoff.

7. The method of claim 1, further comprising:
specifying said one or more conditions in a management frame; and
transmitting said management frame in said wireless local area network.

8. The method of claim 1, further comprising:
communicating with said mobile station at one or more of said supported data rates reserved for limited use when said mobile station is unable to communicate with said access point at any one of said advertised data rates.

9. The method of claim 1, further comprising:
limiting a duration of said communications.

10. The method of claim 9, further comprising:
specifying a permitted duration of said communications in a management frame; and
transmitting said management frame in said wireless local area network.

11. The method of claim 9, further comprising:
informing said mobile station how much time of said duration remains.

12. The method of claim 1, further comprising:
limiting a duration of said communications to an amount of time that is sufficient for said mobile station to perform a handoff from said access point to another network.

13. The method of claim 12, wherein said other network is a cellular network.

14. The method of claim 1, further comprising:
receiving a request from a mobile station for permission to communicate with said access point at one of said supported data rates reserved for limited use; and
informing said mobile station whether said permission has been granted.

15. The method of claim 1, further comprising:
specifying said one or more supported data rates reserved for limited use in a management frame; and
transmitting said management frame in said wireless local area network.

16. A method in a mobile station, the method comprising:
receiving an advertisement from a wireless access point belonging to a wireless local area network, wherein said wireless access point has specified a minimum data rate for advertisement in said wireless local area network from a list of data rates that are supported by said wireless access point, wherein said wireless access point has reserved for limited use those of said supported data rates that are less than said minimum data rate for advertisement, and wherein said advertisement includes an indication of said minimum data rate;
receiving from said wireless access point a management frame that specifies those of said supported data rates that are reserved for limited use;
signaling to said wireless access point that a handoff of said mobile station from said wireless access point to a network of a different type than the network to which said wireless access point belongs is imminent; and
requesting from said wireless access point permission to communicate with said wireless access point at one of said one or more supported data rates that are reserved for limited use.

17. The method of claim 16, wherein said network of a different type is a cellular network.

18. The method of claim 16, further comprising:
receiving from said wireless access point permission to communicate with said wireless access point at one of said one or more supported data rates that are reserved for limited use; and
communicating with said wireless access point at one of said one or more supported data rates that are reserved for limited use.

19. A wireless access point comprising:
a wireless communication interface through which said wireless access point is able to support a wireless local area network and to communicate with mobile stations;
a processor coupled to said wireless communication interface; and
a memory coupled to said processor,
wherein said wireless access point is to specify a minimum data rate for advertisement in said wireless local area network from a list of data rates that are supported by said wireless access point, said wireless access point is to advertise an indication of said minimum data rate, and said wireless access point is to reserve for limited use those of said supported data rates that are less than said minimum data rate for advertisement, and
wherein said memory is to store indications of one or more conditions for use of said one or more supported data rates reserved for limited use, and code which, when executed by said processor, denies permission to a mobile station to communicate with said wireless access point at any of said supported data rates reserved for limited use where none of said one or more conditions is satisfied by said mobile station, and permits said mobile station, where at least one of said conditions is satisfied by said mobile station, to communicate with said wireless access point at one or more of said one or more supported data rates reserved for limited use.

20. The wireless access point of claim 19, wherein said code, when executed by said processor, recognizes from a transmission received from said mobile station via said interface that at least one of said conditions is satisfied by said mobile station, prior to permitting said mobile station to communicate with said wireless access point at said one or more supported data rates reserved for limited use.

21. The wireless access point of claim 19, wherein said code, when executed by said processor, transmits via said interface a management frame having incorporated therein an indication of said one or more supported data rates reserved for limited use.

22. The wireless access point of claim 21, wherein said code, when executed by said processor, incorporates in said management frame an indication of said one or more conditions.

23. The wireless access point of claim 21, wherein said memory stores an indication of a duration of time, and said code, when executed by said processor, incorporates in said management frame an indication of said duration of time and limits a duration of communications at any of said supported data rates reserved for limited use to said duration of time.

24. The wireless access point of claim 19, wherein said supported data rates reserved for limited use, and said conditions are configurable.

25. The wireless access point of claim 19, wherein said memory stores an indication of a duration of time, and said code, when executed by said processor, limits a duration of communications at any of said supported data rates reserved for limited use to said duration of time.

26. The wireless access point of claim 25, wherein said code, when executed by said processor, transmits via said interface a management frame having incorporated therein an indication of said one or more supported data rates reserved for limited use and an indication of said duration of time.

* * * * *